United States Patent
Lottes

(10) Patent No.: US 11,691,672 B2
(45) Date of Patent: Jul. 4, 2023

(54) METHOD FOR OPERATING A DRIVER ASSISTANCE UNIT OF A MOTOR VEHICLE USING A NAVIGATION TARGET SPECIFICATION DEVICE, CONTROL UNIT, NAVIGATION TARGET SPECIFICATION DEVICE, AND MOTOR VEHICLE

(71) Applicant: Audi AG, Ingolstadt (DE)

(72) Inventor: Daniel Lottes, Ihrlerstein (DE)

(73) Assignee: AUDI AG, Ingolstadt (DE)

( * ) Notice: Subject to any disclaimer, the term of this patent is extended or adjusted under 35 U.S.C. 154(b) by 225 days.

(21) Appl. No.: 16/968,487

(22) PCT Filed: Feb. 13, 2019

(86) PCT No.: PCT/EP2019/053588
§ 371 (c)(1),
(2) Date: Aug. 7, 2020

(87) PCT Pub. No.: WO2019/162169
PCT Pub. Date: Aug. 29, 2019

(65) Prior Publication Data
US 2020/0398742 A1  Dec. 24, 2020

(30) Foreign Application Priority Data

Feb. 20, 2018 (DE) .................... 10 2018 202 526.6

(51) Int. Cl.
*B60Q 1/50* (2006.01)
*B60Q 1/48* (2006.01)
(Continued)

(52) U.S. Cl.
CPC ............... *B60Q 1/50* (2013.01); *B60Q 1/484* (2013.01); *G05D 1/0236* (2013.01); *G06K 7/1417* (2013.01); *B60Q 2400/50* (2013.01)

(58) Field of Classification Search
CPC ...... B60Q 1/50; B60Q 1/484; B60Q 2400/50; G05D 1/0236; G06K 7/1417; B62D 15/0285; B62D 15/027
(Continued)

(56) References Cited

U.S. PATENT DOCUMENTS 7,012,548 B2 * 3/2006 Ishii ..................... G08G 1/168
 701/1
7,075,456 B2 * 7/2006 Tanaka ............... B62D 15/0285
 701/41
(Continued)

FOREIGN PATENT DOCUMENTS

CN 105620391 A 6/2016
DE 102006050550 A1 4/2008
(Continued)

OTHER PUBLICATIONS

International Preliminary Report on Patentability directed to related International Patent Application No. PCT/EP2019/053588, dated Apr. 30, 2020, with attached English-language translation; 14 pages.
(Continued)

*Primary Examiner* — Eric Blount
(74) *Attorney, Agent, or Firm* — Sterne, Kessler, Goldstein & Fox P.L.L.C.

(57) ABSTRACT

The relates to a method for operating a driver assistance unit of a motor vehicle using a navigation target specification device. A control unit operates by: receiving a target specification signal describing a projection on a trafficable driving surface; establishing the portion of the trafficable driving surface to which the light of the projection is applied as a driving target region; and, based on the received target specification signal, establishing a relative position of the motor vehicle relative to the driving target region. There is also a step of receiving an orientation signal from an orientation detection unit of the navigation target specifica-
(Continued)

tion device, which describes a spatial target specification orientation of the navigation target specification device in the driving target region, on which basis a navigation target is established. Depending on the established relative position and the established navigation target, there is a step of establishing a movement path to the navigation target, a step of generating a navigation signal describing a controlling of the motor vehicle along the established movement path, and a step of transmitting the generated navigation signal to the driver assistance unit of the motor vehicle.

16 Claims, 2 Drawing Sheets

(51) Int. Cl.
*G05D 1/02* (2020.01)
*G06K 7/14* (2006.01)
(58) Field of Classification Search
USPC .......................................................... 340/468
See application file for complete search history.

(56) References Cited

U.S. PATENT DOCUMENTS

| | | | | |
|---|---|---|---|---|
| 7,366,595 | B1 * | 4/2008 | Shimizu | B60K 35/00 701/472 |
| 9,926,008 | B2 * | 3/2018 | Hafner | B62D 13/06 |
| 10,926,701 | B2 * | 2/2021 | Suzuki | G08G 1/143 |
| 2002/0011367 | A1 * | 1/2002 | Kolesnik | G05D 1/0248 180/167 |
| 2006/0190147 | A1 * | 8/2006 | Lee | B62D 15/028 701/28 |
| 2006/0202984 | A1 * | 9/2006 | Yang | G06T 3/4038 345/419 |
| 2007/0100543 | A1 * | 5/2007 | Kato | B62D 15/027 340/932.2 |
| 2008/0129544 | A1 * | 6/2008 | Augst | B62D 15/0285 340/932.2 |
| 2010/0211267 | A1 * | 8/2010 | Shimazaki | G08G 1/168 340/932.2 |
| 2013/0060421 | A1 * | 3/2013 | Kadowaki | B62D 15/027 701/36 |
| 2018/0004020 | A1 * | 1/2018 | Kunii | G03B 21/562 |

FOREIGN PATENT DOCUMENTS

| | | | |
|---|---|---|---|
| DE | 102012022087 A1 | 5/2014 | |
| DE | 102014011811 A1 | 2/2016 | |
| DE | 102014219538 A1 | 3/2016 | |
| DE | 102017207805 A1 | 11/2018 | |
| EP | 1176487 A1 | 1/2002 | |
| JP | 2006256382 A | 9/2006 | |
| KR | 20120033162 A | 4/2012 | |
| WO | WO-2016128654 A1 * | 8/2016 | ............. B60Q 1/48 |
| WO | WO 2016128654 A1 | 8/2016 | |
| WO | WO-2021037858 A1 * | 3/2021 | ............. B60Q 1/486 |

OTHER PUBLICATIONS

International Search Report and Written Opinion of the International Searching Authority directed to related International Patent Application No. PCT/EP2019/053588 dated May 10, 2019, with attached English-language translation; 22 pages.

* cited by examiner

METHOD FOR OPERATING A DRIVER ASSISTANCE UNIT OF A MOTOR VEHICLE USING A NAVIGATION TARGET SPECIFICATION DEVICE, CONTROL UNIT, NAVIGATION TARGET SPECIFICATION DEVICE, AND MOTOR VEHICLE

TECHNICAL FIELD

The present disclosure relates to a method for operating a driver assistance unit of a motor vehicle. A driver assistance unit is understood to be a device or a device component that is configured to support the driver in specific driving situations and can intervene partially autonomously or autonomously in the drive, control or signaling systems of the motor vehicle. The driver assistance unit can preferably be designed as a driver assistance system or as a control unit with a driver assistance system.

BACKGROUND

Motor vehicles need a steering wheel. Nowadays, parts for autonomous driving are already implemented in the motor vehicle, and fully autonomous driving is implemented in prototypes.

However, an architecture of highly autonomous motor vehicles always provides a steering wheel, since in exceptional situations or situations in which the autonomous system reaches its limits, control by the driver must still be possible. Moreover, autonomous motor vehicles cannot "know," for example in which parking spaces they should preferably park or where they should stop. However, a steering wheel not only requires a lot of installation space, but also takes up space in the interior of the motor vehicle, so that a passenger who possesses in front of the steering wheel has less freedom of movement.

DE 10 2014 219 538 A1 describes a method for operating mobile platforms, wherein the mobile platforms are each configured for signaling in order to project the unique movement path of the mobile platform in the spatial environment of the mobile platform.

DE 10 2014 011 811 A1 describes a motor vehicle with a lighting system for informing a road user about a planned movement of the autopilot-controlled motor vehicle by imaging a light pattern onto a trafficable surface.

Both methods therefore only show how the motor vehicle currently behaves or will behave. However, these are only indications for other road users and the aforementioned problem with autonomously controlled motor vehicles in borderline situations is not taken into account.

EP 1 176 487 A1 describes an autonomously navigating robot system, the orientation of which depends on a current laser projection line pattern recorded by a camera and taking into account previous examinations of a course and an arrangement of the reflecting line patterns. Although the system can orient itself, in other words it knows where it is, a user would still need a steering wheel for any takeover of the driving task if a system of this type is implemented in a motor vehicle.

BRIEF DESCRIPTION OF DRAWINGS/FIGURES

DETAILED DESCRIPTION

Figure 1:
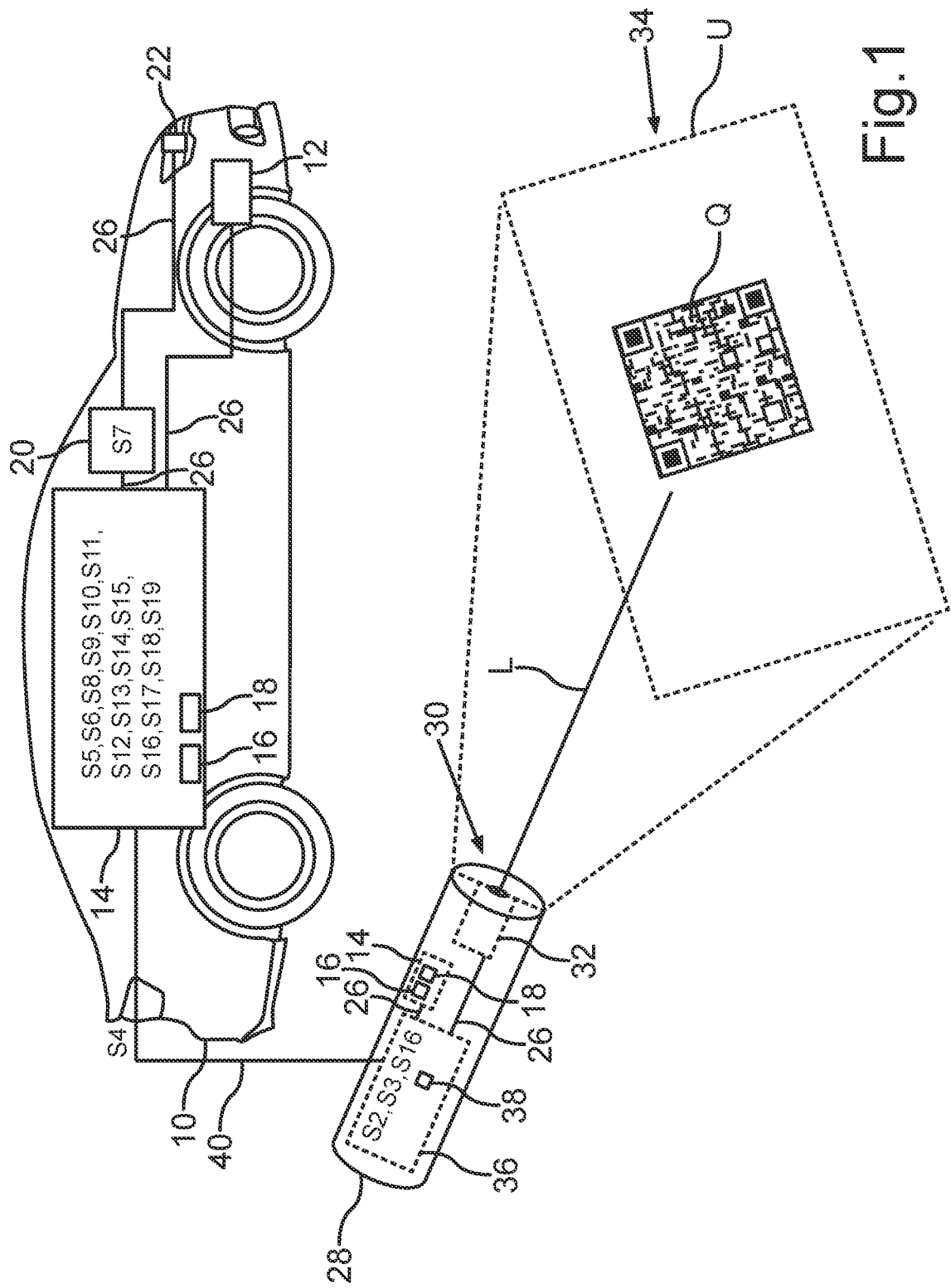
FIG. 1 illustrates a navigation target specification device and a method, in accordance with some embodiments.

One object of the present disclosure is to enable a motor vehicle to be controlled without a steering wheel.

The stated object is achieved by the method according to various embodiments, as described herein, and the devices according to various embodiments, as described herein, in accordance with the coordinate independent claims. Advantageous further developments are provided by the dependent claims.

The present disclosure is based on the idea of providing a navigation target specification device for specifying a navigation target by orienting it toward a driving target or navigation target, and the region in which the motor vehicle is to come to an immediate stop that is marked, for example by a light point and/or a projection of an image. The navigation target is determined by geographic coordinates of the driving target region of a driving surface that is trafficable by a motor vehicle. In other words, a user of the navigation target specification device points, for example, using a specification region of the navigation target specification device to, for example, the parking space to which the motor vehicle is to drive. In contrast to a direction specification with a steering wheel, it is not the next direction of travel that is specified, but rather the region of the exemplary road on which the motor vehicle is to come to a stop. In contrast to a navigation device, wherein the navigation target is established by entering the geographical coordinates of the driving target, the desired parking position can be selected directly, for example, as the driving target at which the motor vehicle is to end the journey.

The navigation target specification device can therefore be made very small and handy and therefore does not take up much installation space. The navigation target specification device does not take up a large part of the movement space of an occupant and can be operated with one hand. The method according to various embodiments and the devices according to various embodiments make it possible to specify even small regions, for example, a parking space, as the navigation target. With the navigation target specification device according to various embodiments and the method according to various embodiments, autonomous and semi-autonomous motor vehicles can be provided without a steering wheel.

Because the driver of the motor vehicle has more freedom of movement due to the lack of a steering wheel, operating the motor vehicle is safer for the driver in, for example, an accident situation, since, for example, there is no steering wheel in front of his upper body in a collision.

In contrast to a steering wheel, the navigation target specification device does not have to be in mechanical or wired contact with a steering gear, which is why the navigation target specification device can also be used as a remote control. By enabling control by means of such a remote control, the motor vehicle can also be called remotely without the need for extended interaction, for example, no cumbersome extraction of a mobile device, for example, a smartphone, from a pocket, no opening of a user program ("app"), and no requesting of the motor vehicle via, for example, such an app.

For the reasons mentioned, the method according to various embodiments and the devices according to various embodiments are well suited to bridging system weaknesses of autonomously driving motor vehicles.

In some embodiments, the method according to the invention for operating a driver assistance unit of a motor vehicle using a navigation target specification device has the following steps carried out by a control unit. A control unit is understood here to mean a device or a device component for receiving and evaluating signals, as well as for generating control signals, and can be designed, for example, as a control unit or control board. The motor vehicle can preferably be designed as an automobile, in particular as a passenger car or a piloted passenger car.

In some embodiments, the control unit operates by receiving a target specification signal from a detection device of the motor vehicle, the target specification signal describing a projection of an image and/or a light point and/or a light field on a driving surface that is trafficable by the motor vehicle, preferably a projection from an output device of the navigation target specification device. This will later serve to orient the motor vehicle in space, the projection specifying a target position. The detection device is a device or a device component for taking or otherwise capturing the image, and can have, for example, a camera and/or a light sensor. An output device is a device component or a device for outputting light and/or a light or image signal. The output device can be designed, for example, as a laser pointer or as a projector or as a lamp.

The control unit establishes the portion of the trafficable driving surface to which the light of the projection is applied as a driving target region. Depending on the received target specification signal, a current, relative position of the motor vehicle is established relative to the established driving target region.

There is a step of receiving an orientation signal from an orientation detection unit of the navigation target specification device, which describes a spatial target specification orientation of the navigation target specification device to the driving target region. The orientation detection unit is understood to be a device component that is designed and/or configured to detect a spatial orientation of the navigation target specification device and, for example, can generate a rotation rate signal that can describe the detected orientation, that is to say, for example, a spatial position of the navigation target specification device. For this purpose, the orientation detection unit can have, for example, a gyrometer and/or a GPS receiver and/or a rotation rate sensor. The orientation signal can be, for example, the rotation rate signal, a GPS signal or a location signal. The target specification orientation is the orientation of the navigation target specification device in which it is oriented, for example, to a predetermined region in the driving target region. By way of a non-limiting example, through an operating action, the user can specify when the navigation target specification device is in the target specification orientation.

In some embodiments, by way of a non-limiting example, no steering maneuver that specifies a direction of travel is carried out, but the absolute navigation target is specified by indicating or pointing to the driving target region by using the navigation target specification device.

In some embodiments, depending on the received orientation signal, an absolute position of the driving target region is established as a navigation target, which can be characterized, for example, by geographic coordinates, for example, by a comparison to geographic coordinates of a position of the navigation target specification device. For example, a specification region of an elongated navigation target specification device can be arranged, for example, at an end region of the navigation target specification device, which can point to the navigation target and can apply the driving target region with light. By way of a non-limiting example, the method according to various embodiments can also include the step of establishing an orientation of the specification region, for example depending on the orientation of the navigation target specification device.

Depending on the established relative position of the motor vehicle relative to the established driving target region and the established navigation target, the control unit establishes a movement path from a current position of the motor vehicle to the navigation target.

In some embodiments, a navigation signal can be generated describing a controlling of the motor vehicle along the established movement path to the navigation target. The generated navigation signal is then transmitted to the driver assistance unit of the motor vehicle. The driver assistance unit can then steer the motor vehicle to the established navigation target. The aforementioned advantages result here.

A particularly user-friendly and intuitive operation and a very precise specification of the navigation target is made possible by the method according to various embodiments, the control unit being able to receive a rotation rate signal as an orientation signal from the orientation detection unit, the rotation rate signal being able to describe a change in a reference orientation of the navigation target specification device to the target specification orientation.

In some embodiments, the reference orientation is a first orientation of the navigation target specification device that the navigation target specification device assumes before being repositioned into the target specification orientation. An orientation is understood to mean a spatial position and/or an absolute geographical position of the navigation target specification device. A position is understood here to mean the manner in which the navigation target specification device is three-dimensional in space, for example, a relative position in space, that is to say, a position which can change within the same position with constant geographic coordinates, for example by rotating or pivoting. The reference orientation and target specification orientation can be determined, for example, depending on an orientation of a longitudinal axis of the navigation target specification device.

In some embodiments, by way of a non-limiting example, the orientation signal or rotation rate signal can describe a repositioning of the navigation target specification device, for example, a change in an initial position. The repositioning can be carried out, for example, by pivoting, changing the position or changing the angle of, for example, the longitudinal axis. By way of a non-limiting example, the orientation signal can describe a rotation rate of the navigation target specification device. The navigation target can be established depending on the received rotation rate signal; preferably by establishing an angle of rotation described by the rotation rate signal about an axis of symmetry of the navigation target specification device, and/or by establishing a change of an absolute geographical position of the navigation target specification device described by the rotation rate signal. The navigation target can be determined particularly accurately by both variants, in particular by a combination of both variants.

In some embodiments, by way of a non-limiting example, the control unit can establish a distance between the specification region of the navigation target specification device and the driving target region to which the specification region of the navigation target specification device is oriented. The generation of the navigation target signal can then depend on the established distance. For this embodiment, the orientation detection unit can have a laser measuring stick, for example. This variant also enables the navigation target to be determined very precisely.

In some embodiments, the navigation target can be established by establishing an orientation of a beam path of an output light beam, preferably a laser beam, of an output device of the navigation target specification device, the output device preferably being designable as a light pointer. In this embodiment, the light of the light beam is applied to the driving target region, which can also be referred to as the driving target, so that the user of the navigation target specification device can see which navigation target he specifies. This prevents incorrect operation, and the navigation target can thus be specified very precisely.

In some embodiments, by way of a non-limiting example, the target specification signal can describe an image of an outline of the motor vehicle projected onto the projection surface of an environment of the navigation target specification device. The projected image can preferably be output by the output device of the navigation target specification device, wherein the output device can have, for example, an illuminant, for example a lamp, and a template with the outline of the motor vehicle, through which the light of the lamp can shine.

In some embodiments, the control unit can use the received target specification signal to determine a target position of the motor vehicle at the navigation target, wherein the generated navigation signal can describe and thus specify the target position. Such a target position can, for example, specify where and/or how the rear of the motor vehicle and the motor vehicle front are to be arranged. Accordingly, the user is provided with a positioning aid and an orientation aid.

In some embodiments, if the projection is an image of an identification code specific to the navigation target specification device, preferably a QR code, the control unit can use the received target specification signal to establish the identification code and, depending on the determined identification code, check an authorization of the navigation target specification device for specifying the navigation target. By way of a non-limiting example, the navigation target specification device can be authenticated with the identification code, and the control unit can authenticate the navigation target specification device depending on the detected identification code. For this purpose, the control unit can have, for example, image analysis software and, for example, read out the identification code depending on the captured image.

In some embodiments, the navigation target signal may only be generated if the checking establishes the authorization of the navigation target specification device.

In some embodiments, the control unit can check whether the target specification signal transmitted by the navigation target specification device is directed to the motor vehicle or not. The target specification signal can thus be assigned to the correct motor vehicle. This can prevent incorrect operation. Above all, it is difficult for an unauthorized person to control the motor vehicle using an unauthorized navigation target specification device.

In some embodiments, to ensure that the motor vehicle does not endanger the user when driving along the movement path if the user uses the navigation target specification device as a remote control, the control unit may use the current position of the motor vehicle and/or a current position of the navigation target specification device to establish a relative or absolute position of the user of the navigation target specification device relative to the motor vehicle. In this case, the establishment of the movement path may depend on the established position of the user.

In some embodiments, the above object is achieved by a control unit, which is configured to carry out the method steps relating to a control unit of a method of the above-described embodiments. The control unit can have a processor device, that is to say a device or a device component for electronic data processing. The processor device can preferably comprise at least one microcontroller and/or at least one microprocessor. A program code, which can be stored in a memory device, that is to say in a data memory, can be designed, when executed by the processor device, to cause the control unit to carry out the method steps relating to the control unit of the above embodiments of the method according to various embodiments, as described herein.

In some embodiments, the above object is achieved by a navigation target specification device which has an orientation detection unit, the orientation detection unit being designed and/or configured to detect a spatial orientation of the navigation target specification device. The navigation target specification device is also configured to generate the orientation signal describing the detected orientation.

In some embodiments, the navigation target specification device also has an output device, which is designed as a light pointer for outputting a light beam, and/or for outputting and/or projecting an image. By way of a non-limiting example, the output device can be designed as a so-called "laser pointer" or, for example, have a light source and a template, the template being able to transmit the light in the form of the image to be projected.

In some embodiments, the navigation target specification device can have an embodiment of the control unit.

In some embodiments, the navigation target specification device can be designed and/or configured as a motor vehicle key. By way of a non-limiting example, the motor vehicle key can be a radio key. A multifunctional navigation target specification device is thereby provided.

In some embodiments, the navigation target specification device can be arranged, for example, on an instrument panel of the motor vehicle. By way of a non-limiting example, in order to facilitate remote control and to avoid complex retrofitting of a motor vehicle, the navigation target specification device can be designed as a mobile, portable device.

The above object is achieved by a motor vehicle, which has an embodiment of the control unit according to some embodiment, an embodiment of the navigation target specification device according to some embodiment. By way of a non-limiting example, the motor vehicle can be designed as an automobile, for example, as a partially autonomous and/or piloted passenger car.

The present disclosure also includes the combinations of the described embodiments.

Exemplary embodiments of the present disclosure are described below.

In the exemplary embodiments, the components of the embodiments that are described each constitute individual features to be considered independently of one another and in a combination that is different from the combination described. In addition, the embodiments described can also be supplemented by further features, as described herein.

In the figures, functionally identical members are each denoted with the same reference signs.

FIG. 1 illustrates a navigation target specification device and a method, in accordance with some embodiments.

FIG. 1 shows an exemplary motor vehicle 10, which can be designed, for example, as a passenger car, which can be operated in a semi-autonomous and/or piloted driving mode by means of a driver assistance unit 12. The driver assistance unit 12 can be designed, for example, as a driver assistance system known to the person skilled in the art.

The motor vehicle 10 has a control unit 14, which can be designed, for example, as a control unit or control board. The exemplary control unit 14 can have a processor device 16, which can have, for example, a plurality of microprocessors. The control unit 14 of the motor vehicle 10 of FIG. 1 can also have a memory device 18, for example an SD card, a hard disk or a memory chip. A program code for carrying out the method according to the invention can be stored on such a memory device.

The motor vehicle 10 of FIG. 1 furthermore shows a detection device 20, which may have a light sensor and/or a camera 22 as an example. The camera can be arranged, for example, on a rear view mirror, on an instrument panel or on an outside of motor vehicle 10. The detection device 20 can be designed, for example, as a control board. To evaluate the exemplary camera images or the information from the light sensor, the control unit 14 can have, for example, image processing software or software for evaluating the corresponding signal. The exemplary detection device 20 can be, for example, an already existing detection system of the motor vehicle 10, which was installed for piloted driving.

The components of the motor vehicle are shown connected in FIG. 1 by data communication links 26. Such a data communication link 26 can preferably be, for example, a data bus of the motor vehicle 10, or, for example, a conventional wireless data communication connection.

FIG. 1 also shows an exemplary navigation target specification device 28, which can be designed, for example, as a laser pointer. In the example of FIG. 1, the navigation target specification device 28 is designed as a mobile, portable device, but can alternatively be a device of the motor vehicle 10 that can be arranged, for example, on a rear view mirror or on an instrument panel. In the exemplary arrangement in the motor vehicle 10, the navigation target specification device 28 can be rotatably mounted, for example, via a ball joint.

The exemplary navigation target specification device 28 can be designed, for example, with a rod-like or elongated shape and have an output device 32 at a specification region 30, for example, which can be, for example, at one end of the rod shape. In the exemplary embodiment as a laser pointer, the output device 32 can be designed as a light pointer known to the person skilled in the art from the prior art and can have a suitable illuminant for this purpose. As an alternative or in addition, the output device 32 can be designed, for example, as a screen and/or as a light, for which purpose the output device 32 can have, for example, a light source, for example a plurality of light-emitting diodes or a lamp.

In the example in FIG. 1, a beam path L is shown along which a light beam can be emitted, for example. If the output device 32 is designed, for example, to output an image 34 or a large light field, then this can be output on a background as a projection surface. In the example in FIG. 1, the output device 32 can output, for example, an image 34 of the motor vehicle outline U and/or an image 34 of a QR code as an exemplary identification code Q that is specific to the navigation target specification device 28 (method step S1). For projecting or outputting the vehicle outline U, a template can be arranged, for example, on the specification region 30, so that the light strikes the projection surface only in the outline specified by the template, for example.

In accordance with some embodiments, by way of a non-limiting example, the identification code Q can be generated, for example, by the control unit 14 of the motor vehicle 10 and can be transferred to the navigation target specification device 28 via a data communication link. In accordance with some embodiments, by way of a non-limiting example, such an identification code Q can be "learned" by the motor vehicle 10, that is to say the control unit 14, i.e., the identification code Q can have been programmed into the processor device 16 and/or the memory device 18.

By way of a non-limiting example, the image 34 shows, for example, a large P in order to increase user convenience, because the user can only see that he is just then specifying a desired parking position. Such an exemplary image 34 can be described, for example, by an image signal of the output device 32, the image signal being output, or else it being possible to apply a corresponding template to the specification region 30.

The navigation target specification device 28 has an orientation detection unit 36, that is to say, for example, a component group with a position sensor and/or a rotation rate sensor and/or a gyrometer. Optionally, the orientation detection unit 36 can have a processor device 38 for generating the orientation signal.

By way of a non-limiting example, the navigation target specification device 28 can be configured to transmit, for example, a radio signal to the motor vehicle 10, the radio signal being usable to unlock and/or lock the motor vehicle 10. In other words, the navigation target specification device 28 may optionally be equipped with a radio key technology known from the prior art.

FIG. 1 also shows an optional control unit 14 of the navigation target specification device 28, which—as an alternative to the implementation of the method using the control unit 14 of the motor vehicle 10—can carry out the method.

In the exemplary embodiment in FIG. 1, a user of the navigation target specification device 28 can, for example, stand outside the motor vehicle and hold the navigation target specification device 28 in his hand. In the example in FIG. 1, the user can decide, for example, that he wants to specify the navigation target manually because of hard-packed snow. In such a borderline situation, the motor vehicle 10 may be overwhelmed in the fully piloted driving mode, which is why manual specification of the navigation target can be useful. For example, a similar borderline situation can exist, if, for example, traffic signs are covered by snow or dirt, for example, and cannot be read by the sensor system of motor vehicle 10 in the piloted method.

By way of a non-limiting example, the output device 32 can be activated using an operating element, for example, a button or a touch-sensitive switch of the navigation target specification device 28. As an example, the user is currently standing right next to an available parking space and holds the navigation target specification device 28 in his hand in such a way that the exemplary image 34 or an exemplary light beam is projected or output onto the available parking space. In this example, the available parking space is the driving target region selected by the user. The orientation detection unit 36 can, for example, detect an oblique orientation (method step S2) and generate an orientation signal (S3) describing the orientation. In accordance with some embodiments, by way of a non-limiting example, the orientation detection unit 36 can, for example, detect an angle of rotation that can be described by the orientation signal.

By way of a non-limiting example, it can be provided that the user has to confirm, for example by double pressing or touching an operating element, that the current orientation of the navigation target specification device 28 is an orientation specifying the driving target. In accordance with some embodiments, it may be provided that the user must keep such an operating element pressed, for example, during an entire movement of the motor vehicle 10, that is to say during the entire piloted parking process of the motor vehicle 10. This gives the user additional control and an additional option to cancel the parking process if necessary.

In accordance with some embodiments, by way of a non-limiting example, an absolute position can be recorded as an orientation (S2), for example, an absolute geographical position with specific geographic coordinates. For this purpose, the navigation target specification device 28, in particular the orientation detection unit 36, can have a GPS receiver, for example.

In accordance with some embodiments, by way of a non-limiting example, via a wireless data communication link 40, the generated orientation signal can be transmitted in step S4 to the control unit 14 of the motor vehicle 10 that receives the orientation signal (S5). The orientation signal describes the target specification orientation of the navigation target specification device 28, that is, the orientation to the driving target region. Depending on this received orientation signal, the control unit 14 can establish (S6), for example, the coordinates at which the driving target region is located and establish the marked parking space as a navigation target.

The detection device 20 of the motor vehicle 10 detects the projection of the image 34 (S7) and transmits a corresponding target specification signal to the control unit 14. The latter receives the target specification signal in step S8. By way of a non-limiting example, the control unit 14 can read out the exemplary QR code, for example, using image processing software, and thus establish the identification code Q (S9). The established identification code Q can be compared, for example, to an identification code stored in the memory device 18, and in the example of FIG. 1, the authorization of the navigation target specification device 28 can be checked (S10) and established, for example, by such a comparison.

In step S11, the driving target region is established, that is, the exemplary parking space. By comparing the coordinates of the driving target region and a current position of the motor vehicle 10, for example, the control unit 14 can establish, for example, the relationship of the motor vehicle 10 to the driving target region, in the example of FIG. 1 obliquely to the left of the driving target region. (S12).

The target position and the analyzed vehicle outline can be compared to one another, so that the control unit 14 can, for example, evaluate in which region of the parking lot the rear of the motor vehicle should go after parking. This position can then be determined by evaluating image 34 (S15), and for this purpose, for example, image 34 of outline U can have colored markings to clarify the desired position.

To additionally support a measurement and/or detection of the orientation (S2), the orientation detection unit 36 and/or the control unit 14 may, for example, carry out a distance measurement, for example, by analyzing the camera image with an angle of the navigation target specification device 28, or, the orientation detection unit 36 can have, for example, a range finder known from the prior art.

By way of a non-limiting example, the navigation target specification device 28 can specify the movement path, that is to say the distance that the motor vehicle 10 is to travel. For this purpose, the user can, for example, pivot the navigation target specification device 28 from the motor vehicle 10 to the driving target. In this way, for example, a reference orientation of the navigation target specification device 28 can be compared to the target specification orientation, for example after receiving a rotation rate signal as an orientation signal (S13). In the optional method step S14, for example, an angle of rotation can be established.

In method step S17, depending on the established, relative position of the motor vehicle 10 relative to the established driving target region and depending on the established navigation target, the movement path is established and a corresponding navigation signal describing this movement path is generated (S18), and this signal is transmitted to the driver assistance unit 12 (S19). The navigation signal is then the control signal for operating the driver assistance unit 12.

By way of a non-limiting example, the motor vehicle 10 can be contacted by the navigation target specification device 28, for example by transmitting the established position of the user to the control unit 14. This can be achieved, for example, using a GPS signal, for example via a long-range radio link, or via a coupling with, for example, a smartphone of the user. When pairing via an exemplary smartphone, the position sensor of the smartphone and the ability of the smartphone can be used for long-range transmission. This is particularly helpful when the user is far away from the motor vehicle 10.

If, as in the example in FIG. 1, the user is outside the motor vehicle 10, the generated navigation signal can, for example, describe a low speed of the motor vehicle 10 for parking, so that the user of the motor vehicle 10 is not injured by a rapid movement of the motor vehicle 10 if possible. For example, a position sensor with position detection can be used for this, and the control unit 14 can establish whether the driver is in the motor vehicle 10 or outside. A suitable standard for localization in closed rooms, for example based on Bluetooth Low Energy (Bluetooth-LE), is known to the person skilled in the art from the prior art. Such a system can be based on a transmitter-receiver principle, in which small transmitters ("beacons") can be placed as signal transmitters that can transmit signals at fixed time intervals. If a receiver, for example the navigation target specification device 28, comes within range of a transmitter, the standard for identification ("universal unique identifier," "UUI") can be identified and its signal strength measured. The position of the navigation target specification device 28 can be determined, for example, by trilateration or fingerprinting method. It can thus be established, for example, whether the user of the motor vehicle 10 is just then in the motor vehicle 10 or not (S16).

The relative position of the user relative to the motor vehicle (S16) can be established by the control unit 14, or by the control unit 14 of the navigation target specification device 28, or by the orientation detection unit 36.

For use as a remote control, it can be provided, for example, that the exemplary light pointer function is only activated on the last 20 meters of the movement path, that is to say starting with visual contact with the motor vehicle 10.

Figure 2:
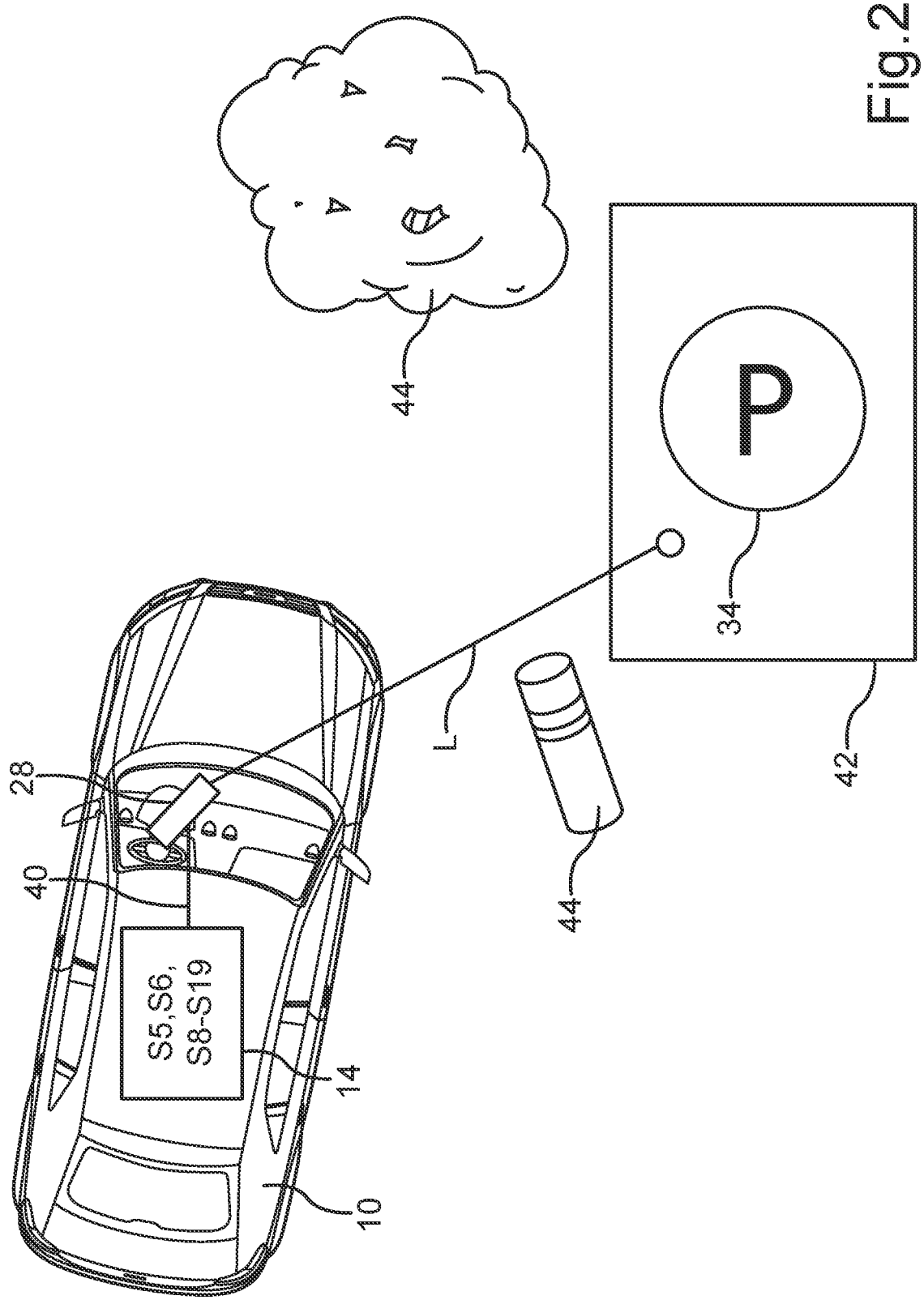
FIG. 2 illustrates an example of a method, in accordance with some embodiments.

FIG. 2 shows a further exemplary embodiment by the method and the devices according to some embodiments, as described herein, which being shown only schematically, only the differences being discussed below. FIG. 2 shows a top view of motor vehicle 10. In this example, the user can be inside the motor vehicle 10 and have the navigation target specification device 28, for example, placed on the instrument panel, or the navigation target specification device 28 can, for example, be arranged rotatably on the instrument panel or on a rear view mirror. The method according to various embodiments, as described herein, can be carried out, for example, as already explained above for FIG. 1. For the sake of clarity, for example, the technical details of the navigation target specification device 28 are not shown, although they may correspond to those in FIG. 1. For reasons of clarity, the driver assistance unit 12 and the detection device 20 of the motor vehicle 10 are also not shown in FIG. 2.

The user can, for example, point to an available parking space 42 with the navigation target specification device 28, the output device 32 of the navigation target specification device 28 being able, for example, to throw a light beam along the beam path L onto the parking space 42. By way of a non-limiting example, the navigation target specification device 28 can, for example, use the output device 32 to project the image 34 onto the parking space 42 as the driving target region, for example the image 34 of a large P in a circle.

In the example in, there may be an obstacle 44 between the motor vehicle 10 and the available parking space 42, for example a post. When establishing the movement path (17), this obstacle 44 can be taken into account, which can be recognized as such, for example, by a motor vehicle's own sensor system. A possible movement path of the motor vehicle 10 can then, for example, not take place along or parallel to the beam path L, but instead, for example, in a serpentine line between the exemplary post and the exemplary tree of FIG. 2.

Overall, the exemplary embodiments illustrate how a control, for example, a laser control, of a motor vehicle 10 is provided.

In accordance with some embodiments, the navigation target specification device 28 can be designed as a vehicle key, which can preferably fulfill three functions: 1. a manual control of the motor vehicle 10 (without a steering wheel) from the motor vehicle 10, 2. a display of a driving target region, preferably a parking position (the operator/user is outside the motor vehicle 10, for example), and 3. calling the motor vehicle 10 from a distance (no visual contact).

In accordance with some embodiments, the manual control of the motor vehicle (without steering wheel) from the motor vehicle 10, for example, an autonomous motor vehicle 10 can come into a borderline situation. For example, it may be at a broken traffic light and the road signs may be covered by a truck standing on the edge. In this example, the user can, for example, remain in his driver's seat and use his vehicle keys (preferably with an integrated laser pointer as output device 32) to project a trajectory point and/or a trajectory onto the road. The motor vehicle 10 can follow the point and/or the trajectory, so it can behave semi-autonomously. As long as the user presses a button on the vehicle key, for example, the motor vehicle 10 can drive at a slow speed towards the projection point and/or along the trajectory. The exemplary vehicle key means a navigation target specification device 28 with an integrated vehicle key function.

By way of a non-limiting example, the exemplary laser pointer can display the target position and the outline U of the motor vehicle 10. The exact target position can be detected by, for example, a position sensor in the exemplary laser pointer and a comparison of a calculated target position to the vehicle outlines, which can be detected by, for example, the camera 22 (S6).

In accordance with some embodiments, when a parking position is being displayed (the operator/user stands outside the motor vehicle 10), the user of an autonomous motor vehicle 10 can stand outside the motor vehicle 10 on the roadside, for example. He now wants to guide the motor vehicle 10 into a specific parking space. For this purpose, he can preferably have two options: a) a distinct gesture, for example a double press or by means of a separate button of the exemplary key, can carry out an autonomous parking process. All that is required is to mark the target position with the exemplary laser. In a second option b), the motor vehicle 10 can be guided into the exemplary parking space by, for example, a long press. For this purpose, the exemplary laser can mark which path, that is to say which movement path, the motor vehicle 10 is to follow (see variant 1).

In accordance with some embodiments, calling motor vehicle 10 from a distance (no visual contact), the user can have no visual contact with motor vehicle 10. The user and the motor vehicle 10 can be located some distance from one another. After contacting the motor vehicle 10, the exemplary vehicle key, that is to say the exemplary navigation target specification device 28 with the vehicle key function, can transmit a position of the user and "trigger" the motor vehicle 10 for an autonomous drive to the position of the user, that is, to specify and trigger the autonomous driving. In a first option A), the key itself can be equipped with technical equipment for determining the position, as well as with a radio device. As a result, the exemplary vehicle key itself can transmit the position of the user to the motor vehicle 10. In option B), the key can connect to, for example, a user's smartphone (for example via BT-LE). Position data and a pick-up request can then be transmitted to the motor vehicle 10 via the smartphone and its integrated position determination method.

In an exemplary technical implementation, the navigation target specification device 28, which can be designed as a vehicle key, for example, can have the following elements: a laser pointer, which can project a unique feature, i.e., a predetermined image 34, onto a street, for example, a QR code; a clear, forgery-proof (radio) identifier for unequivocal communication between the navigation target specification device 28 and the motor vehicle 10; and/or for example a button for guiding the motor vehicle 10 and/or for example for the parking command and/or for a pick-up command.

By way of a non-limiting example, other elements can be: a position determination (for example GPS/GLONASS/Galileo) and/or a long-range radio link (for example LTE) and/or a connection to a mobile device, for example a smartphone (for example Bluetooth-LE) and/or a position detection for unambiguous position determination (for example a gyrometer for comparing the position of the exemplary laser pointer/vehicle key and the projected area). Other elements of the motor vehicle 10 can be: a radio signal receiver and/or a position determination and/or a camera for detecting the laser point and/or an autonomous driving system with surroundings and position detection. The exemplary vehicle key can preferably have the first three named vehicle key elements, as well as one or more of the optional elements; furthermore, the motor vehicle 10 can preferably have all of the motor vehicle elements mentioned.

According to a further exemplary embodiment, in the method of FIG. 1, a distance can be established in a first stage between the navigation target specification device 28 and the driving target region and/or an orientation in space, preferably a relative position using a position sensor. In the second stage, the target specification signal from the exemplary camera 22 and/or an exemplary laser point can be compared.

The invention claimed is:

1. A method for operating a driver assistance unit of a motor vehicle using a navigation target specification device, the method comprising:

receiving, at a control unit, a target specification signal from a detection device of the motor vehicle, wherein the target specification signal describes a projection on a trafficable driving surface by the motor vehicle, and wherein the projection is detected by the detection device;

establishing, by the control unit, a portion of the trafficable driving surface to which a light of the projection is applied as a driving target region;

based on the received target specification signal, establishing, by the control unit, a relative position of the motor vehicle relative to the driving target region;

receiving, by the control unit, an orientation signal from an orientation detection unit of the navigation target specification device, wherein the orientation signal describes a spatial target specification orientation of the navigation target specification device in the driving target region, wherein the navigation target specification device is configured as one of a motor vehicle key or a mobile device;

based on the received orientation signal, establishing, by the control unit, a navigation target according to an absolute position of the driving target region;

based on the established relative position of the motor vehicle and the established navigation target, establishing, by the control unit, a movement path from a current position of the motor vehicle to the navigation target;

generating, by the control unit, a navigation signal describing a control of the motor vehicle along the established movement path to the navigation target; and transmitting, by the control unit, the generated navigation signal to a driver assistance unit of the motor vehicle.

2. The method of claim 1, further comprising:

receiving, by the control unit, a rotation rate signal as an orientation signal from the orientation detection unit, wherein the rotation rate signal describes a change in a reference orientation of the navigation target specification device to the spatial target specification orientation;

establishing, by the control unit, the navigation target based on the received rotation rate signal;

establishing, by the control unit, an identification code based on the received target specification signal, wherein an image of the identification code is the projection specific for the navigation target specification device; and based on the established identification code, checking an authorization of the navigation target specification device for specifying the navigation target, wherein the navigation target signal is generated in response to the checking establishes authorization of the navigation target specification device.

3. The method of claim 1, further comprising establishing, by the control unit, an angle of rotation based on a rotation rate signal corresponding to an axis of symmetry of the navigation target specification device.

4. The method of claim 1, further comprising establishing, by the control unit, a change of an absolute geographical position of the navigation target specification device corresponding to a rotation rate signal.

5. The method of claim 1, wherein establishing the navigation target further comprises establishing an orientation of a beam path of an output light beam from an output device of the navigation target specification device.

6. The method of claim 5, wherein the output device is a light pointer.

7. The method of claim 1, wherein the target specification signal includes a projected image of an outline of the motor vehicle on a projection surface of an environment of the navigation target specification device.

8. The method of claim 1, further comprising determining, by the control unit, a target position of the motor vehicle at the navigation target, wherein the generated navigation signal includes the target position of the motor vehicle.

9. The method of claim 2, wherein the identification code is a Quick Response (QR) code.

10. The method of claim 1, further comprising:

based on the current position of the motor vehicle or a current position of the navigation target specification device, establishing, by the control unit, a relative position of a user of the navigation target specification device relative to the motor vehicle.

11. The method of claim 10, wherein the establishment of the movement path depends on the established relative position of the user.

12. A control unit configured to perform operations comprising:

receiving a target specification signal from a detection device of the motor vehicle, wherein the target specification signal describes a projection on a trafficable driving surface by the motor vehicle, and wherein the projection is detected by the detection device;

establishing a portion of the trafficable driving surface to which the light of the projection is applied as a driving target region;

based on the received target specification signal, establishing a relative position of the motor vehicle relative to the established driving target region;

receiving an orientation signal from an orientation detection unit of the navigation target specification device, wherein the orientation signal describes a spatial target specification orientation of the navigation target specification device in the driving target region, wherein the navigation target specification device is configured as one of a motor vehicle key or a mobile device;

based on the received orientation signal, establishing a navigation target according to an absolute position of the driving target region;

based on the established relative position of the motor vehicle and the established navigation target, establishing a movement path from a current position of the motor vehicle to the navigation target;

generating a navigation signal describing a control of the motor vehicle along the established movement path to the navigation target; and transmitting the generated navigation signal to a driver assistance unit of the motor vehicle.

13. A navigation target specification device comprising:

an orientation detection unit, wherein the orientation detection unit is configured to detect a spatial orientation of the navigation target specification device;

an output device, wherein the output device is configured to output a light beam; and a control unit configured to:

receive a target specification signal from a detection device of the motor vehicle, wherein the target specification signal describes a projection on a trafficable driving surface by the motor vehicle, and wherein the projection is detected by the detection device;

establish a portion of the trafficable driving surface to which the light of the projection is applied as a driving target region;

based on the received target specification signal, establish a relative position of the motor vehicle relative to the established driving target region;
receive an orientation signal from an orientation detection unit of the navigation target specification device, wherein the orientation signal describes a spatial target specification orientation of the navigation target specification device in the driving target region, wherein the navigation target specification device is configured as one of a motor vehicle key or a mobile device;
based on the received orientation signal, establish a navigation target according to an absolute position of the driving target region;
based on the established relative position of the motor vehicle and the established navigation target, establish a movement path from a current position of the motor vehicle to the navigation target;
generate a navigation signal describing a control of the motor vehicle along the established movement path to the navigation target; and
transmit the generated navigation signal to a driver assistance unit of the motor vehicle.

14. The navigation target specification device of claim 13, wherein the output device is further configured to project an image.

15. The navigation target specification device of claim 13, wherein the output device is a light pointer.

16. A motor vehicle, comprising:
a navigation target specification device comprising:
an orientation detection unit, wherein the orientation detection unit is configured to detect a spatial orientation of the navigation target specification device;
an output device, wherein the output device is configured to output a light beam; and
a control unit configured to:
receive a target specification signal from a detection device of the motor vehicle, wherein the target specification signal describes a projection on a trafficable driving surface by the motor vehicle, and wherein the projection is detected by the detection device;
establish a portion of the trafficable driving surface to which the light of the projection is applied as a driving target region;
based on the received target specification signal, establish a relative position of the motor vehicle relative to the established driving target region;
receive an orientation signal from an orientation detection unit of the navigation target specification device, wherein the orientation signal describes a spatial target specification orientation of the navigation target specification device in the driving target region, wherein the navigation target specification device is configured as one of a motor vehicle key or a mobile device;
based on the received orientation signal, establish a navigation target according to an absolute position of the driving target region;
based on the established relative position of the motor vehicle and the established navigation target, establish a movement path from a current position of the motor vehicle to the navigation target;
generate a navigation signal describing a control of the motor vehicle along the established movement path to the navigation target; and
transmit the generated navigation signal to a driver assistance unit of the motor vehicle.

\* \* \* \* \*